US009609935B2

(12) United States Patent
Lee

(10) Patent No.: US 9,609,935 B2
(45) **Date of Patent: *Apr. 4, 2017**

(54) SPOUT-TYPE COSMETIC CONTAINER

(71) Applicant: PUM-TECH KOREA CO., LTD, Incheon (KR)

(72) Inventor: Do Hoon Lee, Incheon (KR)

(73) Assignee: PUM-TECH KOREA CO., LTD., Bupyeong-Gu, Incheon (KR)

( * ) Notice: Subject to any disclaimer, the term of this patent is extended or adjusted under 35 U.S.C. 154(b) by 85 days.

This patent is subject to a terminal disclaimer.

(21) Appl. No.: 14/647,436

(22) PCT Filed: Nov. 8, 2013

(86) PCT No.: PCT/KR2013/010129

§ 371 (c)(1),
(2) Date: May 26, 2015

(87) PCT Pub. No.: WO2014/084520

PCT Pub. Date: Jun. 5, 2014

(65) Prior Publication Data

US 2015/0320175 A1 Nov. 12, 2015

(30) Foreign Application Priority Data

Nov. 27, 2012 (KR) .................. 20-2012-0010901 U

(51) Int. Cl.
*B67D 7/60* (2010.01)
*G01F 11/00* (2006.01)
(Continued)

(52) U.S. Cl.
CPC ............ *A45D 34/04* (2013.01); *A45D 34/00* (2013.01); *B05B 11/3001* (2013.01); *B65D 51/32* (2013.01)

(58) Field of Classification Search
CPC .... A45D 34/04; A45D 34/00; B05B 11/3001; B65D 51/32
(Continued)

(56) References Cited

U.S. PATENT DOCUMENTS 8,308,029 B2 * 11/2012 Ki ...................... B05B 11/0027 222/153.13
2009/0120963 A1 * 5/2009 Bae .................... B05B 11/0032 222/153.13
(Continued)

FOREIGN PATENT DOCUMENTS

KR 20-0453126 Y1 4/2011
KR 20-2012-0002205 U 3/2012
(Continued)

*Primary Examiner* — Patrick M Buechner
*Assistant Examiner* — Jeremy W Carroll
(74) *Attorney, Agent, or Firm* — East West Law Group; Heedong Chae

(57) ABSTRACT

The present invention relates to a spuit-type cosmetic container, and more particularly to a spuit-type cosmetic container capable of extracting an exact amount of cosmetic contents and improving convenience in use as a retractable button and a piston are moved down and fixed when a cap part is coupled to a container body by rotating the cap part, and then the retractable button and the piston are moved up so that the cosmetic contents are sucked into a spuit tube and used when the cap part is separated from the container body by rotating the cap part. The spuit-type cosmetic container according to the present invention includes a container body (110) provided at an upper portion thereof with an opening, an inner cap (132) screwed with the opening (112) of the container body (110), formed in an outer circumference thereof with a rotation annular groove (**132*d*), and including an outer sidewall (132*e*) formed therein with a slit (132*f*), and a cylinder (132*a*) formed in the outer sidewall (132*e*), an outer cap (134**) coupled to an outer portion of the inner cap
(Continued)

(132) and provided on an inner circumference thereof with a cam protrusion (134*a*) and a rotation protruding wheel (134*b*), a retractable button (140) coupled to an inner upper portion of the outer cap (134) movably up and down within a predetermined stroke distance, and including a cam hole (142) having an oblique guide part (142*a*) and a stop hole (142*b*) formed in an outer sidewall (141), an anti-rotation step (145*a*) vertically formed on an inner sidewall (145), and a piston fixing rod (144) formed at a center of the retractable button (140), a piston (150) fixedly fitted to the piston fixing rod (144) of the retractable button (140) to move up and down together with the retractable button (140), an elastic member (160) fitted to the outer sidewall (132*e*) of the inner cap (132) to elastically support the retractable button (140), an anti-separation member (180) coupled to an inner portion of a lower end of the outer cap (134) to prevent the outer cap (134) from being separated from the inner cap (132), and a spuit tube (120) coupled to a spuit tube coupling rod 132*c* of the inner cap (132) to suck up a cosmetic content contained in the container body 110 (spuiting).

10 Claims, 7 Drawing Sheets

(51) Int. Cl.

| | |
|---|---|
| ***A45D 34/04*** | (2006.01) |
| ***B05B 11/00*** | (2006.01) |
| ***A45D 34/00*** | (2006.01) |
| ***B65D 51/32*** | (2006.01) |

(58) Field of Classification Search
USPC .......................................... 222/321.6, 153.13
See application file for complete search history.

(56) References Cited

U.S. PATENT DOCUMENTS

2013/0074983 A1* 3/2013 Choi ...................... A45D 34/04 141/23
2013/0192713 A1* 8/2013 Drugeon et al. ....... A45D 34/04 141/26

FOREIGN PATENT DOCUMENTS

KR 10-1152159 B1 6/2012
KR 20-0463676 Y1 11/2012

* cited by examiner

Prior Art

SPOUT-TYPE COSMETIC CONTAINER

TECHNICAL FIELD

The present invention relates to a spuit-type cosmetic container, and more particularly to a spuit-type cosmetic container capable of extracting an exact amount of cosmetic contents and improving convenience in use as a retractable button and a piston are moved down and fixed when a cap part is coupled to a container body by rotating the cap part, and then the retractable button and the piston are moved up so that the cosmetic contents are sucked into a spuit tube and used when the cap part is separated from the container body by rotating the cap part.

BACKGROUND ART

In general, since essence cosmetics, such as anti-aging cosmetics or anti-wrinkle cosmetics, having high functionality do not contain antiseptic, the cosmetic contents may be significantly easily contaminated. Accordingly, when a user applies the contents of a cosmetic, such as a typical cream-type cosmetic, with a finger or brings an opening of a bottle of a cosmetic such as lotion into contact with the palm of the user to discharge the cosmetic contents for use, a contaminant may be infiltrated into a cosmetic container body from the palm of the user, so that the quality of the cosmetic contents may be degraded.

In addition, when the high functional cosmetics are used, it is preferred that an exact amount or cosmetic contents are used. If a user uses an excessively large or small amount of cosmetic contents, side effects may foe made on a skin of the user, or the inherent effect of the cosmetic may not be made. Accordingly, a cosmetic tool capable of extracting an exact amount of cosmetic contents is strongly required Further, since the high functional cosmetics are high priced, when an exact amount of cosmetic contents is applied to a target part of the user, an economical effect may be made. However, like a conventional cosmetic, when a user puts the cosmetic contents on the palm of the user for use, a great amount of the cosmetic contents may foe absorbed into the palm of the user, so that the high-priced cosmetic contents may be wasted.

A spuit-type cosmetic container has been developed and spread by taking into consideration the above problems, so that a user can use a spuit-type cosmetic container to suck cosmetic contents using a spuit and can apply the cosmetic contents to a target part of a skin.

As shown in FIG. 1, a conventional spuit-type cosmetic container 10 includes a container body 20 to receive cosmetics therein, a cap part 30 to open or close an opening 21 of the container body 20, a button 35 protruding from an upper end of the cap part 30 to move up and down in the cap part 30, a spuit 32 operating together with the button 35 to wove up and down in the cap part 30 so that the cosmetic contents are sucked and discharged, and a spuit tube 33 is mounted on the spurt 32 to suck, or discharge the cosmetic contents received in the container body 20.

However, when using the conventional spuit-type cosmetic container 10, after a user unscrews the container body 20 from the cap part 30 and separates the container body 20 from the cap part 30, the user puts the spuit tube 33 into the cosmetic contents contained in the container body 20, presses the button 35 once, and then separates the cap part 30 from the container body 20 for use. Accordingly, the user may be bothered or inconvenient when using the conventional spuit-type cosmetic container 10.

Accordingly, the applicant of the present invention has suggested a spuit-type cosmetic container disclosed in Korean Utility Model Application No. 20-2011-0008653 filed on Sep. 27, 2011. According to the disclosed invention, a retractable button and a piston are moved down when the cap part is coupled to a container body by rotating the cap part, and the retractable button and the piston are moved up while sucking cosmetic contents into a spuit tube for use when the cap part is separated from the container body by rotating the cap part. However, according to the related art, a control part to prevent a retractable button 134 from being rotated when an outer cap 134 is rotated is not provided, so that an operating error is caused in the operation of the spuit. In addition, since there is not provided a stop part to stop the retractable button 140 after the retractable button 140 has been moved down by rotating the outer cap 134, the retractable button 140 may be unnecessarily moved up.

DISCLOSURE

Technical Problem

The present invention is made in order to solve the problem occurring in the related art, and an object of the present invention is to provide a spuit-type cosmetic container, in which when a container body is caped with a cap part and coupled to the cap part by rotating the cap part, the retractable button is controlled not to be rotated together with the cap part while the retractable button and a piston are moved down and fixed, and then, when the container body is separated from the cap part by rotating the cap part, the retractable button and the piston are moved up so that the cosmetic contents contained in the container body are sucked into a spuit tune to be discharged to be outside, thereby extracting an exact amount of cosmetic contents and improving the convenience in use.

Technical Solution

In order to accomplish the above object, there is provided a spuit-type cosmetic container including a container body 110 provided at an upper portion thereof with an opening, an inner cap 132 screwed with the opening 112 of the container body 110, formed in an outer circumference thereof with a rotation annular groove **132*d*, and including an outer sidewall 132*e* formed therein with a slit 132*f*, and a cylinder 132*a* formed in the outer side wall 132*e*, an outer cap 134 coupled to an outer portion of the inner cap 132 and provided on an inner circumference thereof with a cam protrusion 134*a* and a rotation protruding wheel 134*b*, a retractable button 140 coupled to an inner upper portion of the outer cap 134 movably up and down within a predetermined stroke distance, and including a cam hole 142 having an oblique guide part 142*a* and a stop hole 142*b* formed in an outer sidewall 141, an anti-rotation step 145*a* vertically formed on an inner sidewall 145, and a piston fixing rod 144 formed at a center of the retractable button 140, a piston 150 fixedly fitted to the piston fixing rod 144 of the retractable button 140 to move up and down together with the retractable button 140, an elastic member 160 fitted to the outer sidewall 132*e* of the inner cap 132 to elastically support the retractable button 140, an anti-separation member 180 coupled to an inner portion of a lower end of the outer cap 134 to prevent the outer cap 134 from being separated from the inner cap 132, and a spuit tube 120 coupled to a spuit tube coupling rod 132***c* of the inner cap 132 to suck a cosmetic content contained in the container body 110 (spuiting).

A wiper 190 coupled to the container body 110 to wipe cosmetic contents from an outer wall of the spuit tube 120.

The inner cap 132 is formed on an outer circumference thereof with an elastic mounting step 132*g* on which the elastic member 160 is mounted, and the slit 132*f* formed in the outer sidewall 132*e* includes one slit 132*f* or a pair of slits 132*f* formed at positions symmetrical to each other.

The outer cap 134 is formed in an inner portion of a lower end thereof with a fixed annular groove 134*c* to which the anti-separation member 180 is coupled to prevent the outer cap 134 from being separated from the inner cap 132 when the outer cap 134 is coupled to the inner cap 132. The cam protrusion 134*a* formed on the inner circumference of the outer cap 134 includes one cam protrusion 134*a* and a pair of cam protrusions 134*a* protruding inward from positions opposite to each other.

The number of cam holes 142 formed in the retractable button 140 is equal to the number of the cam protrusions 134*a* formed on the outer cap 134, and the cam holes 142 are formed through the outer sidewall 141 of the retractable button 140 at positions corresponding to the cam protrusions 134*a*. The cam hole 142 includes an oblique guide part 142*a* provided at a lower portion thereof and having a predetermined inclined angle and a stop hole 142*b* provided at an end portion of the oblique guide part 142*a* so that the cam protrusion 134*a* of the outer cap 134 is fitted into the stop hole 142*b* for stopping.

The number of anti-rotation steps 145*a* formed on the retract-able button 140 is equal to the number of the slits 132*f* formed in the inner cap 132, and the anti-rotation steps 145*a* protrude outward from the inner sidewall 145 at positions corresponding to the slits 132*f*.

The piston 150 includes a fixing protrusion 152 extending from a center of an upper portion of the piston 150 to be coupled to the piston fixing rod 144 of the retractable button 140 and a leak preventing member 154 formed on an outer circumference of the piston 150 and fitted into the cylinder 132*a* of the inner cap 132 to prevent a cosmetic content from leaking.

Advantageous Effects

As described above, according to the spuit-type cosmetic container of the present invention, when the container body is caped with the cap part and coupled to the cap pare by rotating the cap part, the retractable button is controlled not to be rotated together with the cap part while the retractable button and the piston are moved down and fixed. Thereafter, when the container body is separated from the cap part by rotating the cap part, the retractable button and the piston are moved up so chat the cosmetic contents contained in the container body are sucked into the spuit tube to be discharged to be outside, thereby extracting an exact amount of cosmetic contents and improving the convenience in use.

BEST MODE

Mode for Invention

Figure 1:
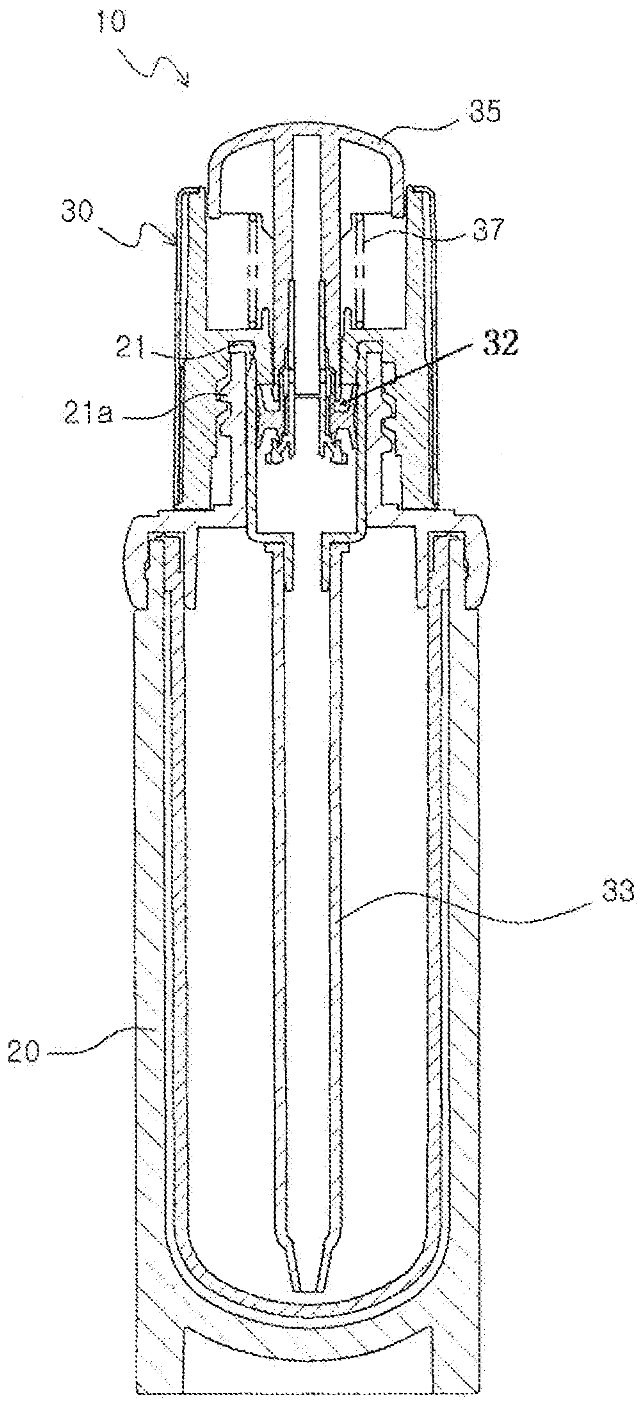
FIG. 1 is a sectional view showing a spuit-type cosmetic container according to the related art.

Hereinafter, embodiments of the present invention will be described with reference to accompanying drawings. In the following description, for the illustrative purpose, the same components will be assigned with the same reference numerals. If it is determined that description about well known functions or configurations may make the subject matter of the embodiments unclear, the details thereof will be omitted.

In addition, terms used in the following description are defined based on functions of the present invention, and may be varied depending on the intents of a producer, or a custom. Accordingly, the terms should be defined based on the overall contents of the specification.

Figure 2:
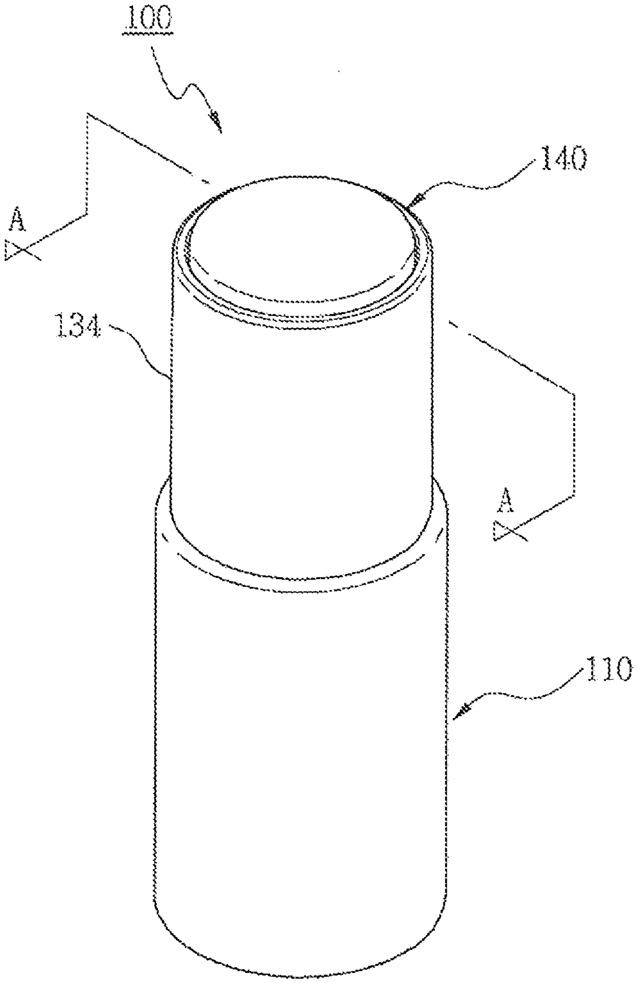
FIG. 2 is a perspective view showing a spuit-type cosmetic container according to an exemplary embodiment of the present invention.
Figure 3:
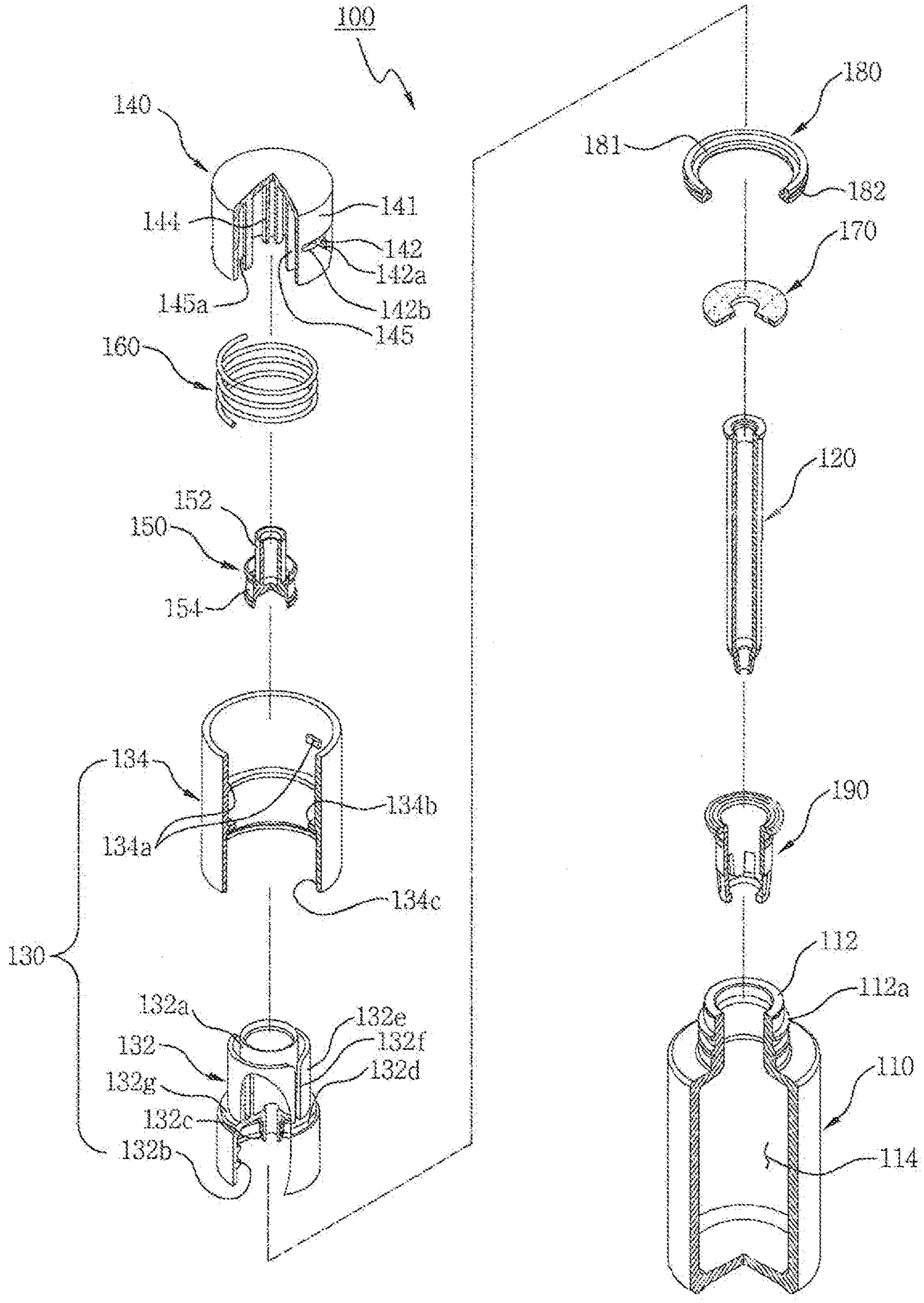
FIG. 3 is an exploded perspective view showing a spuit-type cosmetic container according to an exemplary embodiment of the present invention.
Figure 4:
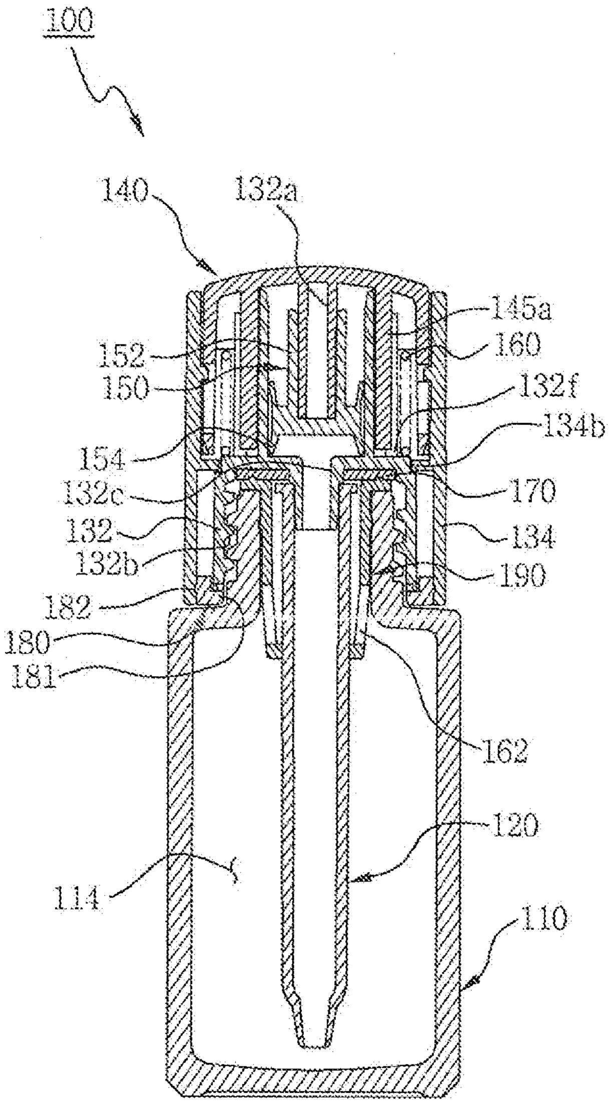
FIG. 4 is a sectional view taken along line A-A' of FIG. 2.
Figure 5:
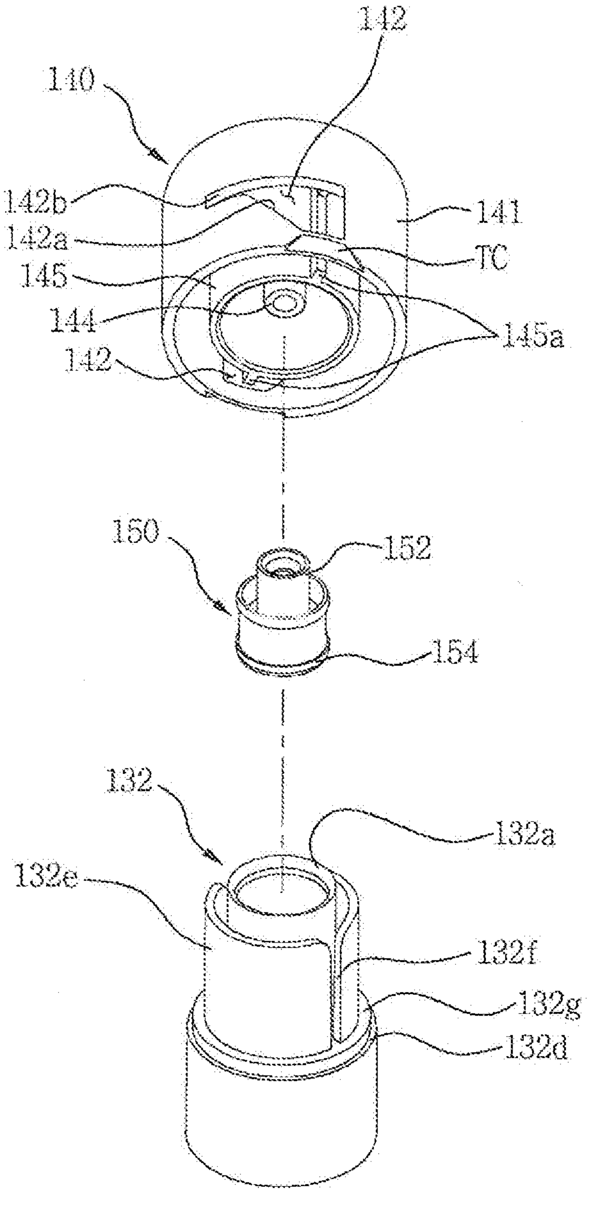
FIG. 5 is a perspective view showing an internal cap and a retractable button according to an exemplary embodiment of the present invention.
Figure 6:
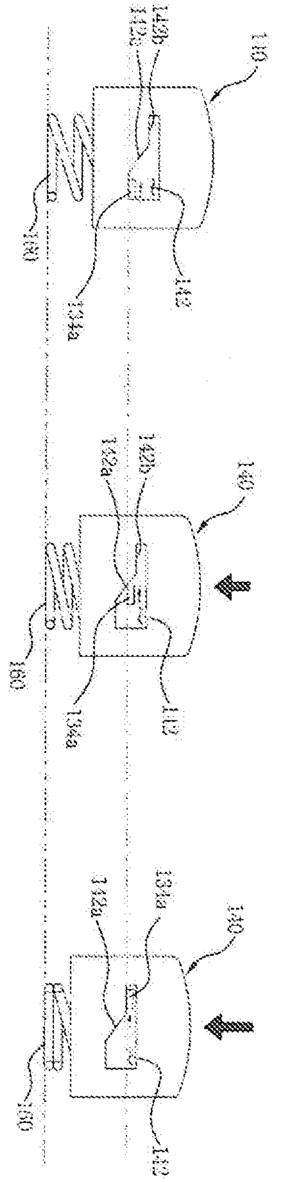
FIGS. 6 and 7 are views showing the operations of a cam protrusion of an outer cap and a cam hole of a retractable button.
Figure 7:
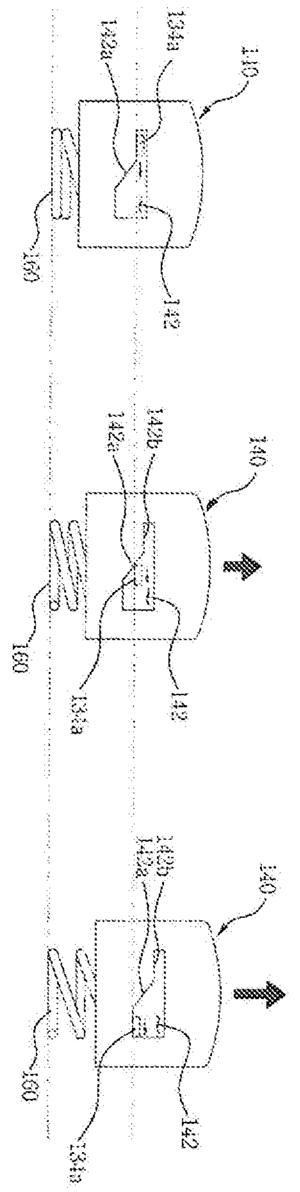

FIG. 1 is a sectional view showing a spuit-type cosmetic container 100 according to the related art. FIG. 2 is a perspective view showing a spuit-type cosmetic container 100 according to an exemplary embodiment of the present invention. FIG. 3 is an exploded perspective view showing a spuit-type cosmetic container 100 according to an exemplary embodiment of the present invention. FIG. 4 is a sectional view taken along line A-A' of FIG. 2. FIG. 5 is a perspective view showing an internal cap and a retractable button according to an exemplary embodiment of the present invention. FIGS. 6 and 7 are views showing the operations of a cam protrusion of an outer cap and a cam hole of a retractable button.

A spuit-type cosmetic container 100 according to the present invention includes a container body 110, a cap part 130 coupled to the container body 110 and including an inner cap 132 and an outer cap 134, the retractable button 140 coupled to an inner upper portion of the outer cap 134 to be movable up and down, a piston 150 fitted into the retractable button 140 to move up and down together with the retractable button 140, an elastic member 160 to elastically support the retractable button 140, an anti-separation member 180 coupled to an inner part of a lower end of the outer cap 134, and a spuit tube 120 to suck up cosmetic contents (spuitting).

The container body 110 is provided therein with a receiving space 114 having a predetermined size to receive cosmetic contents therein, and a screw part 112*a* is formed at an opening 112 of the container body 110 so that the screw part 112*a* is screwed with the inner cap 132.

In addition, a wiper 190 having a vertical through hole shape may be further provided in the opening 112 of the container body 110. The wiper 190 wipes cosmetic contents from an outer circumference of the spuit tube 120 so that the cosmetic contents are received in the receiving space 114 of the container body 110. The wiper 190 is preferably press-fitted into the opening 112, and an upper end portion of the wiper 190 is bent outward to be supported by an upper end portion of the opening 112 of the container body 110. A lower end portion of the wiper 190 is bent inward to make close contact with an outer circumference of the spuit tube 120.

The cam part 130 includes an inner cap 132 and an outer cap 134. The outer cap 134 is covered on and coupled to an outer portion of the inner cap 132. A rotation protrusion wheel 134*b* of the outer cap 134 is mounted on a rotation annular groove 132*d* of the inner cap 132 and freely rotatably coupled to the rotation annular groove 132*d*.

The inner cap 232 is provided at a lower inner circumference thereof with a screw part 132*b* to be screwed with the screw part 112*a* formed at the side of the opening 112 of the container body 110. In addition, the inner cap 132 is provided at an outer circumference thereof with the rotation annular groove 132*d* so that the inner cap 132 is freely rotatably coupled to the rotation protrusion wheel 134*b* of the outer cap 134.

A slit 132*f* is formed in an outer sidewall 132*e* of the inner cap 132 so that an anti-rotation step 145*a* of the retractable button 140 is fitted into the slit 132*f*. Accordingly, the retractable button 140 is not rotated with respect to the inner cap 132, but can be moved up and down. One slit 132*f* or a pair of slits 132*f* formed in opposition to each other may be formed. In addition, an elastic member mounting step 132*g* is formed on the outer circumference of the inner cap 132 so that the elastic member 160 is mounted on the elastic member mounting step 132*g* so elastically support the retractable button 140.

In addition, a cylinder 132*a* is formed in the outer sidewall 132*e* of the inner cap 132 so that the piston 150 is fitted into the cylinder 132*a* to suck or discharge the cosmetic contents. A spuit tube coupling rod 132*c* is formed at the center of a lower inner portion of the inner cap 132 so that the spuit tube 120 is coupled to the spuit cube coupling rod 132*c*.

A leak preventing member 170 may be further provided between the inner cap 132 and the opening 112 of the container body 110 to prevent the cosmetic contents from leaking.

The outer cap 134 is caped and mounted on an outer portion of the inner cap 132 so that the outer cap 134 can be easily separated from the inner cap 132. Accordingly, as shown in FIG. 4, the anti-separation member 180 is fitted to a lower end of an assembly of the outer cap 134 and the inner cap 132 and fixed to the outer cap 134 so that the outer cap 134 and the inner cap 132 can rotate left or right without the separation from each other.

The anti-separation member 180 is configured so that the anti-separation member 180 formed in an annular shape allowing the fitting between the outer cap 134 and the inner cap 132 and protruding inward supports a lower end of the inner cap 132 to prevent the inner cap 132 from being separated down, and a fixed protruding wheel 182 protruding outward is fixedly undercut-coupled to a fixed annular groove 134*c* formed in an inner portion of a lower end of the outer cap 134, so that the outer cap 134 and the inner cap 132 can be freely rotate left or right without the separation from each other.

Accordingly, as shown in FIG. 4, the rotation protrusion wheel 134*b* of the outer cap 134 and an anti-deviation step 181 of the anti-separation member 180 control the rotation annular groove 132*d* of the inner cap 132 and the lower end of the inner cap 132 so that the outer cap 134 and the inner cap 132 can be rotated left or right without the separation from each other.

One cam protrusion 134*a* or a pair of cam protrusions 134*a* are provided at opposite positions of an inner circumference of the outer cap 134, and protrude inward so that a cam hole 142 of the retractable button 140 is fitted around the cam protrusions 134*a*.

The retractable button 140 is coupled to an inner upper portion of the outer cap 134 movably up and down within a predetermined stroke distance. An outer sidewall 141 of the retractable button 140 is formed therein with the cam hole 142 having an oblique guide part 142*a* and a stop hole 142*b*, and an anti-rotation step 145*a* is vertically formed on an inner sidewall 145 of the retractable button 140.

The cam hole 142 includes the oblique guide part 142*a* provided at a lower portion thereof and having a predetermined inclined angle and the stop hole 142*b* provided at an end portion of the oblique guide part 142*a* so that the cam protrusion 134*a* of the outer cap 134 is fitted into the stop hole 142*b*. The cam hole 142 is formed through the outer sidewall 141 of the retractable button 140 positioned corresponding to the cam protrusion 134*a* of the outer cap 134.

Preferably, taper-cutting (TC) is performed only downward of a lower end portion of the cam hole 142 so that the cam protrusion 134*a* of the outer cap 114 is easily inserted into the cam hole 142 of the retractable button 140

Since anti-rotation step 145*a* is inserted into the slit 132*f* of the inner cap 132 while the cam protrusion 134*a* of the outer cap 134 is inserted into the cam hole 142, the retractable button 140 is not rotated with respect to the inner cap 132, but moved only in the vertical direction. The outer cap 134 may be rotated left or right to the extent of the range in which the cam protrusion 134*a* is rotated left or right within the cam hole 142 of the retractable button 140

A piston fixing rod 144 is formed at the center of the inner portion of the retractable button 140 to fixedly couple the piston 150 to the retractable button 140, and the elastic member 160 is interposed between the retractable button 140 and the inner cap 132 so that the retractable button 140 can be continuously elastically supported upward. In this case, the elastic member 160 is interposed between the outer side wall 132*e* of the inner cap 132 and the outer cap 134 and mounted on the elastic member mounting step 132*g* of the inner cap 132.

The number of cam holes 142 formed in the retractable button 140 is equal to the number of cam protrusions 134*a* formed on the external cap 134, and the number of anti-rotation steps 145*a* is equal to the number of slits 132*f* formed in the inner cap 132.

The piston 150 includes a fixing protrusion 152 extending from the center of the upper portion thereof to be coupled to the piston fixing rod 144 of the retractable button 140 and a leak preventing member 154 formed at an outer circumference thereof and fitted into the cylinder 132*a* of the inner cap 132 to prevent cosmetic contents from leaking.

The spuit tube 120 is coupled to the spuit tube coupling rod 132*c* of the inner cap 132 to suck up the cosmetic contents contained in the container body 110.

Through the above configuration, the cam protrusion 134*a* of the cuter cap 134 is rotated while pushing the oblique guide part 142*a* of the retractable button 140 when the cap part 130 is coupled to the container body 110 by rotating the cap part 130 clockwise. In this case, since the anti-rotation step 145*a* of the retractable button 140 is fitted into the slit 132*f* of the inner cap 132, the retractable button 140 is not rotated along the outer cap 134, but pushed down by the oblique guide part 142*a*.

Thereafter, when the cap part 130 is rotated counterclockwise so that the cap part 130 is separated from the container body 110, the retractable button 140 receives force upward due to elastic force of the elastic member 160. In this case, as the cam protrusion 134*a* is moved toward the lower portion of the oblique guide part 142*a*, the retractable button 140 is generally moved upward in the vertical direction.

In the process that the cap part 130 is rotated and separated from the container body 110, the piston 150 is moved upward together with the retractable button 140 due to the elastic force of the elastic member 160 so that the cosmetic contents are sucked up.

The elastic member 160 is interposed between the inner cap 132 and the retractable button 140 to push up the retractable button 140 due to the elastic force when the cap part 130 is rotated and separated from the container body 110. That is to say, the elastic member 160 moves up the retractable button 140 and the piston 150 by elasticity in the process that the cap part 130 is rotated and separated from the container body 110 so that the cosmetic contents contained in the container body 110 may be sucked.

Hereinafter, an operating procedure of the spuit-type cosmetic container 100 according to the present invention will be described.

When the cap part 130 is caped on the container body 110, rotated clockwise and screwed with the container body 110, the retractable button 140 and the piston 150 are moved down in the vertical direction. In other words, when a user holds the container body 110 in one hand and grasps and rotates the outer cap 134 clockwise with the other hand, the cap part 130 is rotated so that the screw part 132*b* of the inner cap 132 is screwed with a screw part 112*a* of the container body 110.

Thereafter, if the user more rotates the outer cap 134 clockwise, the inner cap 132 makes contact with the opening 112 of the container body 110 so that the cap part 130 is not rotated any more, but only the outer cap 134 is rotated with respect to the inner cap 132. In this case, as shown in FIG. 6, the cam protrusion 134*a* of the outer cap 134 pushes the oblique guide part 142*a* of the retractable button 140. Since the anti-rotation step 145*a* is fitted into the slit 132*f* of the inner cap 132, the retractable button 140 is not rotated together with the outer cap 134, but moved down.

Accordingly, as the piston 150 fixed to the lower portion, of the retractable button 140 is moved down together with the retractable button 140, the volume of the cylinder 132*a* of the inner cap 132 can be reduced, so that air can be discharged into the container body no through the spuit tube 120.

Since the elastic member 160 continuously and elastically supports the retractable button 140 upward, the retractable button 140 attempts to lift upward continuously. However, even if force to rotate the outer cap 134 clockwise is eliminated, once the cam protrusion 134*a* is inserted into the stop hole 142*b* of the cam hole 142 as shown in FIG. 6, the cam protrusion 134*a* is locked into the stop hole 142*b* to stop the retractable button 140.

Thereafter, if the cap part 130 screwed with the container body 110 is rotated counterclockwise and unscrewed from the container body 110, the retractable button 140 is moved upward in the vertical direction. In other words, if the user holds the container body 110 in one hand, grasps the outer cap 134 with the other hand, and rotates the outer cap 134 counterclockwise, the outer cap 134 is rotated with respect to the inner cap 132 before the inner cap 132 is separated from the container body 110 because the inner cap 132 is tightly coupled to the opening 112 of the container body 110.

As shown in FIG. 7, if the outer cap 134 is rotated, the cam protrusion 134*a* of the outer cap 134 becomes out of the stop hole 142*b* of the retractable button 140 and moves along the oblique guide part 142*a*. In this case, since the elastic member 160 elastically supports the retractable button 140, the retractable button 140 is moved up.

Accordingly, as the piston 150 fixed to the retractable button 140 is moved up in the cylinder 132*a* of the inner cap 132, the volume of the cylinder 132*a* is increased so that cosmetic contents received in the receiving space 114 of the container body 110 may be sucked through the spuit tube 120.

Thereafter, if the outer cap 134 is more rotated counterclockwise, the cam protrusion 134*a* of the outer cap 134 makes contact with the lateral side of the cam hole 142 of the retractable button 140 so that the outer cap 134 is not rotated any more. Accordingly, the inner cap 132 is rotated together with the outer cap 134 counterclockwise so that the inner cap 132 is unscrewed from the container body 110.

When the inner cap 132 is completely separated from the opening 112 of the container body 110, a user separates the cap part 130 from the container body 110 and places the spuit tube 120 on a target part of the user. Thereafter, the user presses the retractable button 140 so that the cosmetic contents are discharged to the outside and applied co the target part.

Although the exemplary embodiments of the present invention have been described, it is understood that the present invention should not be limited to these exemplary embodiments but various changes and modifications can be made by one ordinary skilled in the art within the spuit and scope of the present invention as hereinafter claimed.

The invention claimed is:

1. A spout cosmetic container comprising:

a container body (110) provided at an upper portion thereof with an opening (112);

an inner cap (132) screwed on to the opening (112) of the container body (110) and comprising an outer sidewall (132*e*) formed therein with a slit (132*f*), and a cylinder (132*a*) formed on the outer sidewall (132*e*);

an outer cap (134) coupled to an outer portion of the inner cap (132) and provided on an inner circumference thereof with a cam protrusion (134*a*);

a retractable button (140) coupled to an inner upper portion of the outer cap (134), and comprising a cam hole (142) having an oblique guide part (142*a*) and a stop hole (142*b*) formed in an outer sidewall (141), an anti-rotation step (145*a*) vertically formed on an inner sidewall (145) of the retractable button (140), and a piston fixing rod (144) formed at a center of the retractable button (140);

a piston (150) fixedly fitted to the piston fixing rod (144) of the retractable button (140) to move up and down together with the retractable button (140);

an elastic member (160) to elastically support the retractable button (140);

an anti-separation member (180) coupled to an inner portion of a lower end of the outer cap (134) to prevent the outer cap (134) from being separated from the inner cap (132); and a spout tube (120) coupled to the inner cap (132).

2. The spout cosmetic container of claim 1, wherein the inner cap (132) further comprises a rotation annular groove (132*d*) around an outer surface of the inner cap (132), and the outer cap (134) further comprises a rotation protruding wheel (134*b*) such that the rotation annual groove (132*d*) couples to the rotation protruding wheel (134*b*).

3. The spot cosmetic container of claim 1, wherein the inner cap (132) further comprises an elastic mounting step (132*g*) around an outer surface of the inner cap (132) on which the elastic member (160) is mounted.

4. The spout cosmetic container of claim 1, wherein a spout tube coupling rod (132*c*) is formed at a lower central portion of the inner cap (132) such that the spout tube coupling rod (132*c*) couples to the spout (120).

5. The spout cosmetic container of claim 1, wherein the slit (132*f*) formed in the outer sidewall (132*e*) of the inner cap (132) comprises one slit (132*f*) or a pair of slits (132*f*) formed at positions symmetrical to each other, a number of anti-rotation steps (145*a*) formed on the retractable button (140) is equal to a number of the slits (132*f*), and the anti-rotation steps (145*a*) protrude outward from the inner sidewall (145) at positions corresponding to the slits (132*f*).

6. The spout cosmetic container of claim 1, wherein the outer cap (134) further comprises a fixed annular groove (132*c*) at a lower end of the outer cap (134) to which a fixed protruding wheel (182) of the anti-separation member (180) is coupled.

7. The spout cosmetic container of claim 1, wherein the piston (150) comprises a fixing protrusion (152) extending from a center of an upper portion of the piston (150) to be coupled to the piston fixing rod (144) of the retractable button (140) and a leak preventing member (154) formed on an outer circumference of the piston (150) and fitted into the cylinder (132*a*) of the inner cap (132) to prevent a cosmetic content from leaking.

8. A spout cosmetic container wherein, when a cap part (130) is rotated and coupled to a container body (110), a anti-rotation step (145*a*) of a retractable button (140) is fitted into a slit (132*f*) of an inner cap (132) to control the retractable button (140) such that the retractable button (140) is not rotated with respect to the inner cap (132), the retractable button (140) and a piston (150) are moved down through interaction between a cam protrusion (134*a*) of an outer cap (134) and an oblique guide part (142*a*) of the retractable button (140), and the cam protrusion (134*a*) is fixedly fitted into a stop hole (142*b*) of a cam hole (142), and, when the cap part (130) is separated from the container body (110), the retractable button (140) and the piston (150) are moved up while a cosmetic content of the container body (110) is sucked into a spout tube (120).

9. The spout cosmetic container of claim 8, wherein the cam protrusion (134*a*) formed on the inner circumference of the outer cap (134) further comprises a pair of cam protrusions (134*a*) formed at positions opposite to each other, and the cam hole (142) further comprise a pair of cam holes (142), which are formed through the outer sidewall (141) of the retractable button (140) at positions corresponding to the cam protrusions (134*a*).

10. The spout cosmetic container of claim 1, wherein the cam protrusion (134*a*) formed on the inner circumference of the outer cap (134) further comprises a pair of cam protrusions (134*a*) formed at positions opposite to each other, and the cam hole (142) further comprise a pair of cam holes (142), which are formed through the outer sidewall (141) of the retractable button (140) at positions corresponding to the cam protrusions (134*a*).

* * * * *